United States Patent Office 3,454,143
Patented July 8, 1969

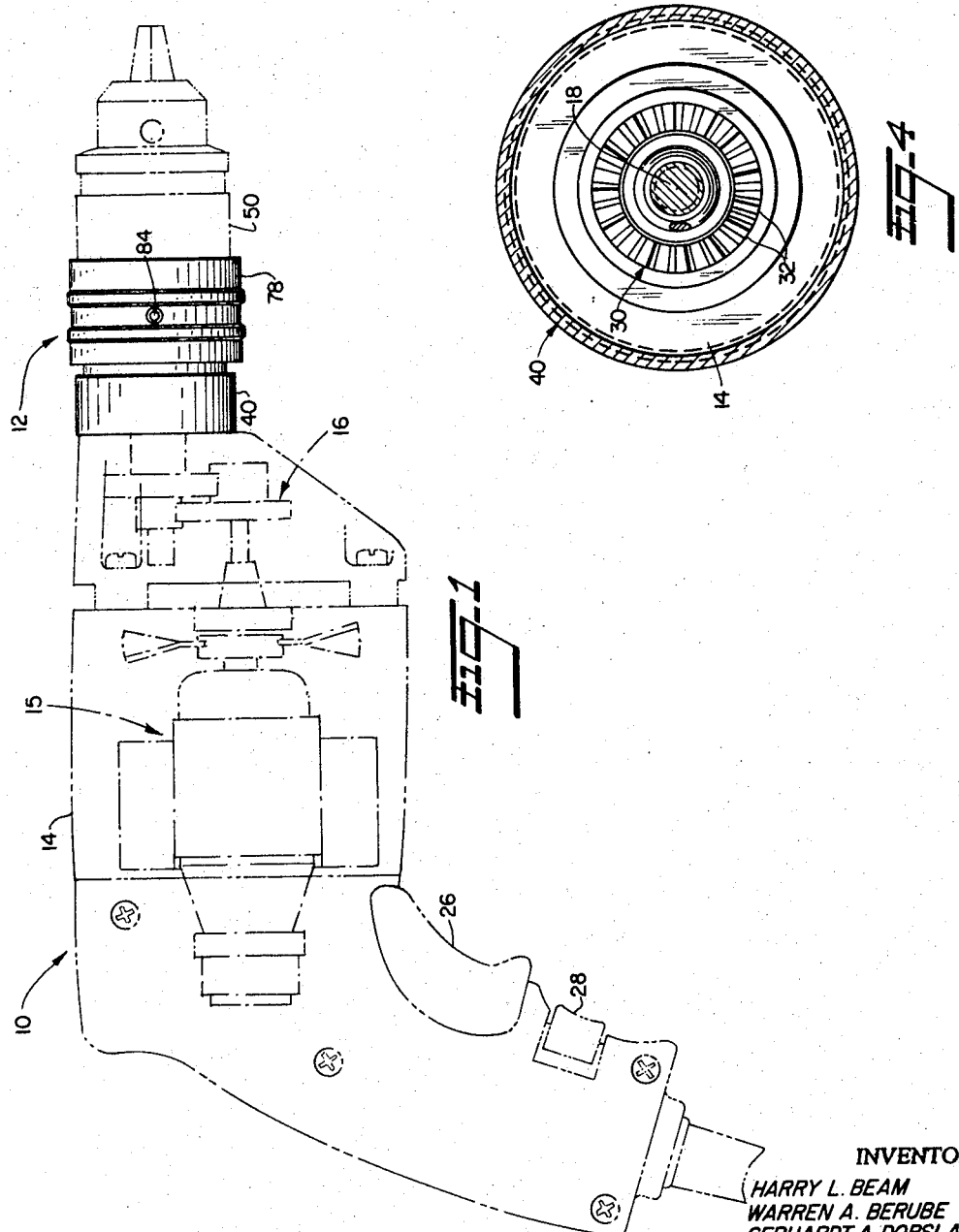

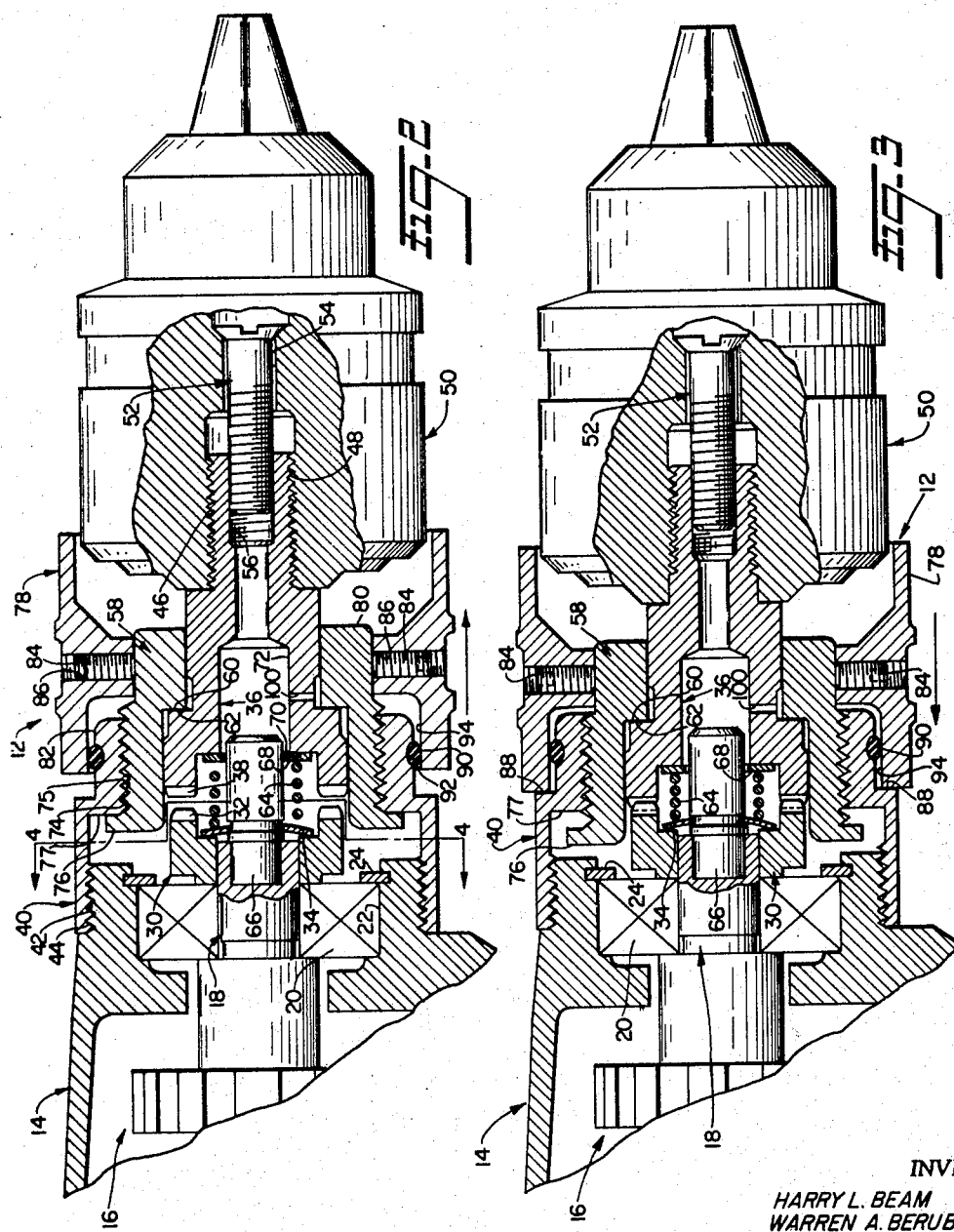

3,454,143
POWER-OPERATED TOOL
Harry L. Beam, Jamesville, Warren A. Berube, Camillus, and Gerhardt A. Dobslaw, Fayetteville, N.Y., assignors to Rockwell Manufacturing Company, Pittsburgh, Pa., a corporation of Pennsylvania
Filed Feb. 9, 1967, Ser. No. 614,944
Int. Cl. F16d 13/04, 41/00, 43/00
U.S. Cl. 192—34                                    12 Claims

ABSTRACT OF THE DISCLOSURE

A power-operated tool having a motor; a first clutch member rotatable by the motor; a second clutch member engageable with the first clutch member to establish a drive connection therebetween but normally biased out of engagement with the first clutch member so that the drive connection normally exists only during operator-effected engagement of the clutch members; and a selectively operable adjusting mechanism for locking the second clutch member in engagement with the first clutch member and thereby establishing the drive connection without operator-effected engagement of the clutch members.

BACKGROUND OF THE INVENTION

The present invention relates to power-operated tools and, more specifically, to power-operated tools adjustable to provide either a continuous, positive drive connection between the motor and tool element or a drive connection that can be established and interrupted at will be the operator.

One type of tool contemplated by the present invention is a combination power-operated drill and screwdriver. The principles of the present invention will be developed by relating them to this type of tool. However, this is not the only application of the principles of the invention. Reference to the exemplary application mentioned above is therefore intended to be illustrative and not limiting.

Drilling and the driving of screws or other fasteners require different types of connections between the motor of the tool and the tool element for best results. For drilling a positive continuous connection is best since it is difficult to withdraw the bit from the hole it has drilled unless the bit is rotating. On the other hand, for driving fasteners, a drive connection which can be established and broken by exerting and releasing pressure on the tool is preferred. This facilitates alignment of the tool element with the fastener and permits the operator to stop the tool element at the exact instant that the fastener is set.

Power-operated combination tools which can be selectively adjusted to provide either of the foregoing modes of operation have heretofore been proposed. In one such type of combination tool a clutch is interposed between the motor of the tool and the tool element. A spring biases the input and output members of the clutch apart. Normally, therefore, the clutch is disengaged; and there is no drive connection between the motor and tool element, which are connected to the clutch input and output members, respectively.

In fastener driving operations the operator provides a drive connection between the motor and tool element by engaging the tool element with the fastener and then exerting pressure on the tool, causing it to move relative to the tool element. This overcomes the effect of the biasing spring and moves the clutch members into engagement. When this pressure is released, the clutch spring separates the input and output members, interrupting the drive connection.

To convert this heretofore known type of tool for drilling, it is provided with a rotatable adjusting member accessible to the operator and connected to a bearing which supports the clutch output member. The bearing is threaded into the tool housing so that as it is rotated by manipulation of the adjusting member it is axially displaced relative to the housing. Axial displacement of the bearing effects a corresponding displacement of the clutch output member, moving it into and maintaining it in engagement with the clutch input member against the influence of the clutch members. Accordingly, it is common in such drive connection.

The type of combination tool just described is exemplified in U.S. Patents Nos. 2,950,626 issued Aug. 30, 1960, to H. O. Short for Combination Portable Electric Drill and Screwdriver and 1,699,870 issued Jan. 22, 1929, to S. O. Black et al. for Portable Tool.

As heretofore proposed such as in the foregoing patents, for example, this type of tool has several disadvantages. For example, the adjusting mechanism is located in the main tool housing. This makes it difficult to remove the adjusting member for servicing or replacement and, also, makes it difficult and expensive to obtain and maintain proper alignment between the clutch input and output members.

Servicing and replacement is made even more difficult and expensive in the heretofore proposed combination tools of the type described above by a permanent attachment of adjusting mechanism elements including the operator-accessible adjusting component and the bearing in which the clutch output member is mounted to the tool housing. This not only precludes disassembly of the adjusting mechanism for servicing, but means that at least the front section of the tool housing as well as the entire adjusting mechanism must be replaced if a component of the adjusting mechanism or the tool housing fails.

A further disadvantage of heretofore known combination tools of the type described above is that screw type elements are employed to lock the adjusting mechanism in the position to which it is adjusted. These must be loosened and retightened every time the tool is converted from its drilling to its fastener driving configuration or vice versa. This requires sufficient time to significantly detract from the versatility of this type of combination tools.

Yet another disadvantage of the heretofore tools is the absence of any provision for adjusting the engagement of the clutch members. Accordingly, it is common in such tools for the clutch members to be too loosely engaged, causing slippage, or too tightly engaged, which results in binding.

SUMMARY OF THE INVENTION

The combination tools of the present invention include generally the same major components of those heretofore known as described above. However, they differ from the latter in that the adjusting mechanism, clutch output member, and tool element holder are integrated into a separate power transmitting and tool holding unit which is detachably fixed to the main tool housing. The detachable unit can be easily and quickly removed from the tool substantially reducing the difficulty in servicing and replacing the adjusting mechanism and associated components encountered in heretofore known combination tools of the type to which this invention relates.

Another important advantage of the removable unit is that it makes possible the use of a bearing arrangement which eliminates the problems heretofore found in securing proper alignment of the cooperating clutch members.

Another important difference between the combination tools of the present invention and those of the same general type heretofore known is that those of this invention can be completely disassembled and all components removed from the housing member by which they are supported. This further substantially facilitates servicing and replacement. It also eliminates the necessity, present in the prior art tools, of replacing the entire adjusting mechanism and at least the front section of the tool housing as well should the housing or a single component of the adjusting mechanism fail. Accordingly, this feature provides a significant reduction in the maintenance costs appurtenant to the previously known combination tools of the same general type.

Yet another important feature of the present invention is a novel arrangement for frictionally retaining the adjusting mechanism in its drilling and fastener driving positions. This eliminates the necessity of loosening and retightening screws or manipulating other locking elements when the tool is shifted from one mode of operation to the other, reducing the time required to change the tool over. This is a decided advantage.

A further important feature of the present invention is the use of an adjusting collar which is adjustable axially of the movable bearing which supports the clutch output member and is displaced to engage the latter with the clutch input member. By properly adjusting the collar along the bearing, heretofore common problems of the slippage between and binding of the clutch members can be eliminated.

From the foregoing it will be apparent that one important and primary object of the present invention is the provision of novel, improved power-operated tools of the type which can be selectively adjusted to provide either a continuous, positive drive connection between the motor of the tool and the tool element or a drive connection which can be established and broken at will by exerting and releasing pressure on the tool.

Other related and important but more specific objects of the invention reside in the provision of power-operated tools in accord with the preceding object:

(1) which are less expensive and easier to service and maintain than the heretofore available power-operated tools of the same general type.

(2) in which the changeover from one mode of operation to the other can be made more easily and quicker than in the heretofore available tools.

(3) in which the adjusting mechanism and associated clutch and tool element holding components are integrated into a separate, readily detachable unit to thereby facilitate the servicing and replacement of the adjusting mechanism and the associated components.

(4) in which the adjusting mechanism can be completely disassembled, further facilitating maintenance and reducing the cost of replacement by making it possible to replace defective components rather than the entire mechanism as has heretofore been necessary.

(5) which are provided with a novel arrangement that is capable of retaining the adjusting mechanism in the position to which it is adjusted without screws or other locking devices and thereby facilitates and reduces the time required to change the tool from one mode of operation to the other by eliminating the necessity of loosening and retightening screws or manipulating other locking devices.

(6) in which problems relating to and/or caused by misalignment of the clutch members are eliminated.

(7) in which the clutch engaging movement can be adjusted to obtain the proper engagement between the clutch input and output members.

Other important objects, further novel features, and additional significant advantages of the present invention will become apparent from the appended claims and as the ensuing detailed description and discussion proceeds in conjunction with the accompanying drawing.

BRIEF DESCRIPTION OF THE DRAWING

In the drawing:

FIGURE 1 is a partly diagrammatic side view of a power-operated tool provided, in accord with the principles of the present invention, with a novel arrangement for changing the tool from a mode of operation in which there is a continuous, positive drive connection between the motor of the tool and the tool element to one in which the drive connection can be established and broken at will by exerting and then releasing pressure on the tool;

FIGURE 2 is a section through the forward end of the tool of FIGURE 1, showing the components of the adjusting mechanism and of a clutch interposed between the motor of the tool and the tool element in the configuration in which they permit the drive connection between the motor and tool element to be established and broken by the operator;

FIGURE 3 is a view similar to FIGURE 2, showing the foregoing components in the configuration in which they establish a positive, continuous drive connection between the motor and tool element; and FIGURE 4 is a section through the tool of FIGURE 1, taken substantially along line 4—4 of FIGURE 2 to more clearly illustrate the construction of the input member of the clutch.

DESCRIPTION OF A PREFERRED EMBODIMENT

Referring now to the drawing, FIGURE 1 illustrates a power-operated, combination screwdriver and drill 10 equipped with a power transmitting and tool element holding unit 12 in accord with the principles of the present invention. This unit can be selectively adjusted to provide either a continuous, positive drive connection between the motor of the tool and the tool element or a drive connection which can be established and broken at will by exerting and releasing pressure on the tool.

In addition to the components just mentioned, screwdriver-drill 10 includes a main housing 14 (which consists generally of a front section 14a connected to an intermediate section 14b by screws 14c and a rear section 14d) surrounding an electric motor 15 connected to a gear reduction drive 15 (see FIGURES 1 through 3) having an output shaft 18. The output shaft is rotatably mounted in a bearing 20 secured in a recess 22 in the front end of housing 14 by a snap-in retainer 24. The operation of the screwdriver motor is controlled by an on-off switch 26 and a switch 28 for reversing the direction of motor rotation. A lock (not shown) is also preferably provided for locking on-off switch 26 in the "on" position.

The details of the components described briefly in the preceding paragraph are not part of the present invention. For this reason and because they may be of conventional construction, they will not be described to an appreciably greater extent herein.

In the present invention, a clutch input member 30 having teeth 32 (see FIGURES 2–4) formed on its forward face is fixed to gear reduction drive output shaft 18 for rotation therewith. Clutch input member 30 is retained on shaft 18 by a snap-in retainer 34.

Axially aligned with clutch input member 30 is a clutch output member 36. The output member has teeth 38 formed on its rearmost face. These, which may have substantially the same configuration as the teeth 32 on the clutch input member, are engageable with the latter to provide a positive drive connection between the clutch input and output members.

Clutch output member 36 is incorporated in the power transmitting and tool element holding unit 12 of screwdriver-drill 10. In addition to clutch member 36, this unit includes a generally cylindrical housing member 40 detachably fixed to the forward end of tool housing 14 by cooperating internal threads 42 on member 40 and external threads 44 on housing 14.

The detachable connection of unit 12 to housing 14 is an important practical feature of the present invention since it permits the unit to be quickly and easily removed from the tool for servicing and replacement of parts. In contrast, in heretofore available power-operated tools of the same general type, the components corresponding to those in this unit are so located with respect to the tool housing that they can be removed only with difficulty, if at all.

Also, detachment of unit 12 gives access to bearing 20, which can then be extracted from housing 14 after removal of retainer 24. This novel arrangement also facilitates replacement of parts and servicing of tool 10.

Referring now to FIGURES 2 and 3, output clutch member 36 has an elongated, circularly sectioned configuration and terminates, at its forward end, in external threads 46. These are adapted to engage cooperating internal threads 48 on tool element holder 50, which may may be a conventional Jacob's chuck, to secure the chuck to the clutch output member for rotation therewith.

In the present invention, chuck 50 is further secured to clutch output member 36 by right-hand threads, which extends through a central bore 54 in the chuck into a drilled and tapped aperture 56 in the forward end of the clutch output member. The hand of the threads on fastener 52 is the opposite to those on the clutch output member. That is, chuck 50 will normally be secured to clutch output member 36 by right-hand threads, which will tend to tighten the chuck on the clutch output member during drilling operations and during the setting of fasteners with conventional right-hand threads. In this case, the threads on fastener 52 and in aperture 56 will be left-hand threads. Fastener 52 will accordingly tend to tighten during screw (or other fastener) removing operations in which the right-hand threads securing the chuck to the clutch output member would tend to loosen. In this manner, the chuck remains firmly attached to the clutch output member regardless of the direction of rotation of the output member. The method of attaching the chuck just described is accordingly a decided improvement over the conventional mode of attachment in which the chuck is simply threaded onto the end of the driving member.

Clutch output member 36 is slidably and rotatably journaled in an elongated, generally cylindrical bearing 58. Cooperating radial shoulders 60 on the clutch output member and 62 on the bearing limit the axial movement of the clutch output member with respect to the bearing.

Shoulder 60 of the clutch output member is biased into engagement with shoulder 62 of bearing 58 by a coil spring 64. Spring 64 surrounds the forward section 66 of gear reduction drive output shaft 18 and bears, at one end, against clutch input member retainer 34. At its opposite end spring 64 bears against a washer 68 surrounding output shaft section 66 and abutting a radial shoulder 70 in the central bore 72 of the clutch output member.

Bearing 58 is fixed to the housing member 40 of unit 12 by cooperating external threads 74 on the bearing and internal threads 75 on the housing member. Bearing 58 may therefore be rotated with respect to the housing member; and such rotation will displace the bearing axially of the latter. Since housing member 40 is fixed relative to clutch input member 30, rotation of bearing 58 will also displace the bearing axially with respect to the clutch member. The axial displacement of bearing 58 causes a similar axial displacement of clutch output member 36 because of the cooperating shoulders 60 and 62 on these elements and spring 64, which maintains the shoulders in continuous engagement.

Accordingly, by rotating bearing 58 in housing member 40, clutch output member 36 can be so positioned that spring 64 will bias it out of engagement with clutch input member 30, as shown in FIGURE 2. Alternatively, bearing 58 can be rotated to displace bearing 58 to a position shown in FIGURE 3, where the bearing maintains clutch output member 36 in continuous engagement with clutch input member 30 despite the biasing influence of coil spring 64.

Clutch output member 36 has oil hole 100 intercommunicating the lubricant groove on the exterior of the output member with the interior. This precludes any air lock and, also acts as a lubricant connection for supplying lubricant from the interior to the external lubricant groove of output member 36.

Axial movement of bearing 58 with respect to housing member 40 is limited, in the forward direction, by the engagement of a radial flange 76 on the bearing with a radial internal shoulder 77 on housing member 40. Axial movement in the rearward direction is limited by the abutting engagement of a generally cylindrical adjusting collar 78 with annular shoulder 88 on housing 40.

Bearing 58 is rotated to move clutch output member 36 from one to the other of the two positions just described by the cylindrical adjusting collar 78. At its forward end collar 78 surrounds the reduced diameter forward end portion 80 of bearing 58. The rear end of the collar surrounds reduced diameter forward end portion 82 of housing member 40. Adjusting collar 78 is attached to bearing 58 for rotation therewith and prevented from moving axially of the bearing by setscrews 84, which extend through drilled and tapped apertures 86 in the collar into engagement with the bearing. While two screws are shown, the number may be reduced to one, or increased, if desired.

In assembling tool 10 bearing 58 is threaded into housing 40 until clutch output member 36 is tightly engaged with input member 30. Bearing 58 is then backed off slightly so that the spring 64 will cause a slight retraction of the output member. At this point the clutch members will engage positively, but without binding. Adjusting collar 78 is then moved into abutting engagement with annular shoulder 88 on housing 40, and setscrews 84 are tightened. Thus, collar 78 provides a stop limiting movement of clutch output member 36 toward input member 30. This is an important feature of the present invention as it prevents the output member from being jammed against the input member with a consequent binding of one or both of the clutch members. This novel arrangement for adjusting the engagement of the clutch members is of course absent in those heretofore known tools discussed above in which the adjusting collar and adjustable bearing are assembled into a unitary structure.

The removability of adjusting collar 78 is also an important practical feature of the present invention since it permits bearing 58 and related components to be removed from housing member 40. This facilitates not only the servicing of unit 12 but, also, the replacement of individual components if they become defective. This is a decided improvement over the heretofore available arrangements in which the components corresponding to those just mentioned are not only incorporated in the main tool housing rather than in a removable unit but, also, are so constructed that they cannot be removed from the main housing.

Another advantage of the removable sleeve is that it makes it possible to locate the bearing 20 supporting the output shaft of the reduction drive in the forward end of the main tool casing. This and the location of the bearing supporting the clutch output member outside of the main tool casing result in a de facto universal type coupling between the clutch members. This eliminates the alignment problems appurtenant to the heretofore available tools in which the clutch or clutch and adjusting mechanism are housed in the main tool casing.

Adjusting collar 78 and bearing 58 are retained in one of the two positions to which they can be adjusted by a friction ring 90 seated in an annular recess 92 in end portion 82 of housing member 40 and engaging the inner wall 94 of the adjusting collar at the rear end thereof. The friction type retaining arrangement is an important practical feature of the present invention since it eliminates the loosening and retightening of screws or manipulation of other locking devices necessary when an adjustment is to be made in heretofore available tools of the same general type as those to which the present invention relates.

Referring again to the drawing, FIGURE 2 illustrates the components of unit 12 in the configuration to which they are adjusted for screwdriving and similar fastener setting operations in which it is desirable that the operator be able to establish and interrupt the drive connection between the motor of the tool and the tool element at will. In this configuration, bearing 58 is located in its forwardmost position with its flange 76 abutting the shoulder 77 on housing member 40 and clutch output member 36 biased out of engagement with clutch input member 30 by coil spring 64. Accordingly, the drive connection between gear reduction drive output shaft 18 (and consequently the tool motor) and chuck 50 (and therefore the tool element) is normally interrupted. This permits the operator to position the tool element on the fastener and then depress on-off switch 26 to energize the motor of the tool. By exerting forward pressure on the tool, the operator can then move the tool forwardly with respect to the tool element (which will be maintained stationary by the fastener) engaging clutch elements 30 and 36 and establishing the drive connection between the motor and tool element. When the fastener has been set to the desired depth, the drive connection can then be interrupted, without releasing switch 26, by simply releasing pressure on the tool. When this is done spring 64 will bias clutch element 36 out of engagement with clutch input element 30 to disengage the clutch and interrupt the drive connection.

Referring still to the drawing, FIGURE 3 illustrates the configuration of the components in unit 12 for drilling operations in which a continuous, positive drive connection between the motor of the tool and the tool element is desired. The components of unit 12 are shifted from the configuration shown in FIGURE 2 to that shown in FIGURE 3 by rotating adjusting collar 78 until bearing 58 has been axially displaced from the position shown in FIGURE 2 to that shown in FIGURE 3. In the latter, as discussed above, bearing 58 is in a limit position in which it engages clutch output element 36 with clutch input element 30 against the biasing influence of coil spring 64. More specifically, as shown in FIGURE 3, with bearing 58 rotated to the limit position just mentioned, the internal shoulder 62 on the bearing engages shoulder 60 on the output member to maintain the latter in engagement with the clutch input member notwithstanding the biasing influence of the spring. Bearing 58 is of course maintained in this limit position by the friction between friction ring 90 and the two elements 40 and 78 between which it is interposed.

In this configuration the rotation of the tool is under the control of the operator solely through on-off switch 26 since the clutch remains engaged regardless of the existence or absence of forward pressure on the tool.

To thereafter restore unit 12 to the fastener driving configuration, it is only necessary to rotate collar 78 until the components have again been shifted to the position shown in FIGURE 2.

The invention may be embodied in other specific forms without departing from the spirit or essential characteristics thereof. The present embodiment is therefore to be considered in all respects as illustrative and not as restricting the scope of the protection to which applicants' are entitled.

What is claimed and desired to be secured by Letters Patent is:

1. A power-operated tool comprising a motor; a first clutch member rotatable by said motor; a second clutch member engageable with said first clutch member to establish a drive connection therebetween; tool holding means rotatable by said second clutch member; means biasing said second clutch member out of engagement with the first clutch member, whereby the drive connection therebetween normally exists only during operator-effected engagement of said members; and selectively operable adjusting means for locking said second clutch member in engagement with the first clutch member against the influence of said biasing means and thereby providing a drive connection therebetween without operator-effected engagement of the members, said adjusting means including a bearing displaceable toward said first clutch member, means for so connecting said bearing to said second clutch member that displacement of said bearing toward said first clutch member effects a corresponding engagement effecting displacement of said clutch member, an operator-accessible member for effecting displacement of said bearing toward said first clutch member, said operator-accessible member being axially displaceable relative to said bearing to compensate for wear, varying tolerances, and the like, and at least one fastener means selectively so engageable with said operator-accessible member and said bearing as to detachably fix said member in an adjusted position axially of said bearing and as to fix said bearing to said member for rotation therewith.

2. The power-operated tool of claim 1 wherein said first and second clutch members are axially aligned and wherein cooperating blind apertures are formed in the adjacent ends of said clutch members, said biasing means being a coil spring disposed in the passage formed by said cooperating apertures and bearing against the ends thereof.

3. The power-operated tool of claim 1 wherein said tool holding means is fixed to said second clutch member by cooperating internal threads on the tool holding means and external threads on the clutch member and including a fastener extending through said tool holding means and threaded into said clutch member, the threads on said fastener having the opposite hand of the cooperating threads on said clutch member and tool holding means to prevent loosening of said tool holding means regardless of the direction of rotation of said tool holding means.

4. A power-operated tool comprising a motor; a first clutch member rotatable by said motor; a second clutch member engageable with said first clutch member to establish a drive connection therebetween; tool holding means rotatable by said second clutch member; means biasing said second clutch member out of engagement with the first clutch member, whereby the drive connection therebetween normally exists only during operator-effected engagement of said members; and selectively operable adjusting means for locking said second clutch member in engagement with the first clutch member against the influence of said biasing means and thereby providing a drive connection therebetween without operator-effected engagement of the members, said adjusting means including a bearing displaceable toward said first clutch member, means for so connecting said bearing to said second clutch member that displacement of said bearing toward said first clutch member effects a corresponding engagement effecting displacement of said clutch member, a rotatable operator-accessible adjusting member detachably fixed to said bearing for effecting displacement of said bearing toward said first clutch member, a housing member surrounding and fixed relative to said first clutch member, said bearing being threaded into said housing, whereby rotation of said bearing relative to said housing displaces said bearing relative to said housing and said first clutch member, and the operator-accessible adjusting member surrounding said bearing and a portion of said housing; and a friction ring disposed exteriorly of said housing and between and in engagement with said operator-accessible adjusting member and the portion of the housing surrounded by said member for retaining said member in the position to which it is rotated.

5. A power-operated tool comprising a first housing comprising at least a front section and a rear section; a motor mounted in said first housing; a gear reduction drive housed in the front section of said first housing and drive-connected to said motor; a first, rotatable, clutch member, said first clutch member being the output element of said gear reduction drive and being fixed against axial movement relative to said first housing; a second clutch member axially aligned with said first clutch member and engageable with said first clutch member to establish a drive connection therebetween; tool holding means fixed to said second clutch member for rotation therewith; cooperating blind apertures formed in the adjacent ends of said clutch members; a coil spring disposed in the passage formed by said cooperating apertures and bearing against the ends thereof for biasing said second clutch member away from said first clutch member, whereby the drive-connection between the clutch members normally exists only during operator-effected engagement of said members; and selectively operable adjusting means for locking said second clutch member in engagement with the first clutch member against the influence of said coil spring and thereby providing a drive connection between said clutch members without operator-effected engagement of said members, said last-named means including a second housing detachably fixed to the front section of said first housing and thereby fixed against movement toward and away from said first clutch member; a bearing threaded into said second housing, whereby rotation of said bearing relative to said second housing displaces said bearing relative to said second housing and said first clutch member; said second clutch member being rotatably mounted in said bearing and there being cooperating internal and external shoulders on said bearing and said second clutch member with the shoulder on said bearing facing toward said first clutch member and the shoulder on said second clutch member facing away from said first clutch member, whereby displacement of the bearing toward the first clutch member effects a corresponding displacement of said second clutch member to engage it with the first clutch member; and means for rotating said bearing to displace it relative to said first clutch member comprising a rotatable adjusting collar surrounding said bearing, said bearing being detachably fixed to said collar for rotation therewith.

6. A power-operated tool comprising a first housing having at least front and rear sections; a motor mounted in said first housing; a first clutch member rotatable by said motor, said clutch member being disposed in the front section of said first housing; a second clutch member engageable with said first clutch member to establish a drive connection therebetween; tool holding means rotatable by said second clutch member; means biasing said second clutch member out of engagement with said first clutch member, whereby the drive connection therebetween normally exists only during operator-effected engagement of said clutch members; and selectively operable adjusting means for locking said second clutch member in engagement with said first clutch member against the influence of said biasing means and thereby providing a drive connection therebetween without operator-effected engagement of said clutch members, said adjusting means including a second housing fixed against displacement relative to said first clutch member; a bearing; means so connecting said bearing to said second housing that rotation of the bearing relative to said second housing displaces said bearing relative to said second housing and said first clutch member; said second clutch member being rotatably mounted in said bearing; means so connecting said second clutch member to said bearing that displacement of said bearing toward the first clutch member effects a clutch engaging displacement of the second clutch member relative to the first clutch member, means for rotating said bearing to displace it relative to said first clutch member comprising a rotatable adjusting collar surrounding said bearing, said bearing being connected to said collar for rotation therewith; and a friction member around said second housing between and engaging said second housing and said adjusting collar for retaining said collar in the position to which it is adjusted.

7. The power-operated tool of claim 6, together with means for fixing said collar to said bearing at adjustable locations therealong and means for limiting the movement of said collar toward said housing to thereby limit the movement of the bearing toward said housing and, accordingly, adjustably limit the engagement of the clutch output member with the clutch input member to prevent the binding of said clutch members.

8. A power-operated tool comprising a first housing comprising at least a front section and a rear section; a motor mounted in said first housing; a gear reduction drive housed in the front section of said first housing and drive-connected to said motor; a first, rotatable, clutch member, said first clutch member being the output element of said gear reduction drive and being fixed against axial movement relative to said first housing in said front section thereof; a second clutch member axially aligned with said first clutch member and engageable with said first clutch member to establish a drive connection therebetween; tool holding means fixed to said second clutch member for rotation therewith; cooperating blind apertures formed in the adjacent ends of said clutch members; a coil spring disposed in the passage formed by said cooperating apertures and bearing against the ends thereof for biasing said second clutch member away from said first clutch member, whereby the drive connection between the clutch members normally exists only during operator-effect engagement of said members; and selectively operable adjusting means for locking said second clutch member in engagement with the first clutch member against the influence of said coil spring and thereby providing a drive connection between said clutch members without operator-effected engagement of said members, said last-named means including a second housing detachably fixed to the front section of said first housing and thereby fixed against movement toward and away from said first clutch member; a bearing threaded into said second housing, whereby rotation of said bearing relative to said second housing displaces said bearing relative to said second housing and said first clutch member; said second clutch member being rotatably mounted in and supported solely by said bearing and there being an internal shoulder on said bearing and a cooperating exteral shoulder on said second clutch member with the shoulder on said bearing facing toward said first clutch member and the shoulder on said second clutch member facing away from said first clutch member, whereby displacement of the bearing toward the first clutch member effects a corresponding displacement of said second clutch member to engage it with the first clutch member; an operator-accessible member for rotating said bearing to displace it relative to said first clutch member comprising a rotatable adjusting collar surrounding said bearing, said operator-accessible member being axially displaceable relative to said bearing to compensate for wear, varying tolerances, and the like; and at least one fastener means selectively so engageable with said operator-accessible member and said bearing as to detachably fix said member in an adjusted position axially of said bearing and as to fix said bearing to said member for rotation therewith.

9. A power-operated tool comprising a housing having at least front and rear sections; a motor mounted in said housing; a first clutch member rotatable by said motor, said first clutch member being disposed in the front section of said housing; a power transmitting and tool holding unit including a housing member; a second clutch member in said housing member engageable with said first clutch member to establish a drive connection therebetween; tool holding means rotatable by said second clutch member; means biasing said second clutch member away from said first clutch member, whereby the drive connection therebetween normally exists only during operator-effected engagement of said clutch members; and adjusting means for locking the second clutch member in engagement with the first clutch member against the influence of said biasing means and thereby providing a drive connection therebetween without operator-effected engagement of said members; and means detachably connecting said power transmitting and tool holding unit to the front section of said housing including cooperating threads on said housing front section and on said housing member of said power transmitting and tool holding unit.

10. A power operated tool comprising a housing having at least front and rear sections; a motor mounted in said housing; a first clutch member rotatable by said motor, said first clutch member being disposed in the front section of said housing; a power transmitting and tool holding unit including a second clutch member engageable with said first clutch member to establish a drive connection therebetween; a bearing rotatably supporting said second clutch member; tool holding means rotatable by said second clutch member; means biasing said second clutch member away from said first clutch member, whereby the drive connection therebetween normally exists only during operator-effected engagement of said clutch members; adjusting means for locking the second clutch member in engagement with the first clutch member against the influence of said biasing means and thereby providing a drive connection therebetween without operator-effected engagement of said members; means detachably connecting said power transmitting and tool holding unit to the front section of said housing; and a bearing rotatably supporting said first clutch member, said bearing being located in the forward end of said housing and being extractable therefrom upon removal of said power-transmitting tool holding unit, said last-mentioned bearing cooperating with the bearing in which said second clutch member is rotatably mounted to eliminate the adverse effects of misalignments in the clutch members.

11. A power-operated tool comprising a first housing having at least front and rear sections; a motor mounted in said first housing; a first clutch member rotatable by said motor, said first clutch member being disposed in the front section of said first housing; a power transmitting and tool holding unit including a second housing, a second clutch member disposed in said second housing and engageable with said first clutch member to establish a drive connection therebetween; tool holding means rotatable by said second clutch member; means biasing said second clutch member away from said first clutch member, whereby the drive connection therebetween normally exists only during operator-effected engagement of said clutch members; and adjusting means for locking the second clutch member in engagement with the first clutch member against the influence of said biasing means and thereby providing a drive connection therebetween without operator-effected engagement of said members; and means detachably connecting said power transmitting and tool holding unit to the front section of said housing.

12. The power-operated tool of claim 1, wherein said second clutch member is rotatably supported solely by said bearing to thereby accommodate variations in manufacturing tolerances and the like.

References Cited

UNITED STATES PATENTS

| | | | |
|---|---|---|---|
| 1,212,126 | 1/1917 | Canfield | 151—27 |
| 1,230,745 | 6/1917 | Madison | 151—27 |
| 2,857,997 | 8/1958 | Garybill | 192—34 |
| 2,950,626 | 8/1960 | Short | 74—333 |

CARLTON R. CROYLE, Primary Examiner.

ALLAN D. HERRMANN, Assistant Examiner.

U.S. Cl. X.R.

192—83, 94

PO-1050
(5/69)

UNITED STATES PATENT OFFICE
CERTIFICATE OF CORRECTION

Patent No. 3,454,143          Dated July 8, 1969

Inventor(s) Harry L. Beam. Warren A. Berube, Gerhardt A. Dobslaw

It is certified that error appears in the above-identified patent and that said Letters Patent are hereby corrected as shown below:

Col. 1, line 5, below "BACKGROUND OF THE INVENTION" "be" should be --by--.

Col. 5, line 20, delete "may" at the end of line.

Col. 5, line 24, "right-hand threads" should be --a threaded fastener 52--.

Col. 5, line 47, change "journaled" to --journalled--.

Col. 10, line 40, "effect" should be --effected--.

SIGNED AND
SEALED
MAR 24 1970

(SEAL)
Attest:

Edward M. Fletcher, Jr.
Attesting Officer

WILLIAM E. SCHUYLER, JR
Commissioner of Patents